(12) United States Patent
Kavars et al.

(10) Patent No.: US 10,812,998 B2
(45) Date of Patent: Oct. 20, 2020

(54) SENSOR AND MONITORING SYSTEM

(71) Applicant: SENSR Monitoring Technologies LLC, Georgetown, TX (US)

(72) Inventors: Christopher L. Kavars, Dubuque, IA (US); Leslie G. Davis, Georgetown, TX (US); Walter F. Bleser, II, Denver, CO (US)

(73) Assignee: SENSR MONITORING TECHNOLOGIES LLC, Georgetown, TX (US)

( * ) Notice: Subject to any disclaimer, the term of this patent is extended or adjusted under 35 U.S.C. 154(b) by 82 days.

(21) Appl. No.: 15/945,393

(22) Filed: Apr. 4, 2018

(65) Prior Publication Data

US 2018/0295535 A1   Oct. 11, 2018

Related U.S. Application Data

(60) Provisional application No. 62/481,775, filed on Apr. 5, 2017.

(51) Int. Cl.
*H04L 12/28* (2006.01)
*H04W 24/10* (2009.01)
(Continued)

(52) U.S. Cl.
CPC ............ *H04W 24/10* (2013.01); *G06F 1/263* (2013.01); *G06F 1/266* (2013.01); *G06F 1/28* (2013.01);
(Continued)

(58) Field of Classification Search
None
See application file for complete search history.

(56) References Cited

U.S. PATENT DOCUMENTS 6,292,108 B1   9/2001   Straser et al.
8,618,934 B2   12/2013  Belov et al.
(Continued)

OTHER PUBLICATIONS

Kottapalli, et al "Two-tiered wireless sensor network architecture for structural health monitoring" Smart Structures and Materials 2003: Smart Systems and Nondestructive Evaluation for Civil Infrastructures, Shih-Chi Liu, Editor, Proceedings of SPIE vol. 5057 (2003).

(Continued)

*Primary Examiner* — Brandon M Renner
(74) *Attorney, Agent, or Firm* — Parsons Behle & Latimer

(57) ABSTRACT

A system for monitoring integrity of a structure includes at least one sensor module and a gateway. The gateway receives data packets from the sensor module(s) and periodically pushes the data packets to an offsite system without receiving a request from the offsite system. Additional data packets may be transmitted on request. The system may include a solar power supply. The system may include a communication module to transmit data packets over a communications link. The communication module may have a dynamic IP address. The communication module may remain in a standby state until additional information is received from the gateway. A method for monitoring integrity of a structure includes determining a power failure and pushing a packet to the offsite system indicating the power failure. A method for monitoring integrity of a structure includes determining an event and transmitting a data packet corresponding to the event.

24 Claims, 6 Drawing Sheets

(51) Int. Cl.
*G06F 1/26* (2006.01)
*H04L 29/08* (2006.01)
*G06F 1/28* (2006.01)
*G06F 1/3209* (2019.01)
*H04W 84/18* (2009.01)

(52) U.S. Cl.
CPC ............ *G06F 1/3209* (2013.01); *H04L 67/12* (2013.01); *H04L 67/26* (2013.01); *H04W 84/18* (2013.01)

(56) References Cited

U.S. PATENT DOCUMENTS

| | | | |
|---|---|---|---|
| 9,267,862 B1 | 2/2016 | Kavars et al. | |
| 9,836,032 B2* | 12/2017 | Kubota | H01M 10/44 |
| 2005/0216302 A1* | 9/2005 | Raji | G06Q 30/02 |
| | | | 705/314 |
| 2007/0050613 A1* | 3/2007 | Islam | H04L 63/0272 |
| | | | 713/150 |
| 2007/0069885 A1* | 3/2007 | Twitchell, Jr. | H04Q 9/00 |
| | | | 340/539.1 |
| 2007/0127500 A1* | 6/2007 | Maeng | H04L 63/10 |
| | | | 370/395.52 |
| 2014/0032433 A1* | 1/2014 | Eick | G06Q 50/163 |
| | | | 705/314 |
| 2014/0254579 A1* | 9/2014 | Huber | G06Q 20/1235 |
| | | | 370/338 |
| 2014/0316708 A1 | 10/2014 | Mollineaux et al. | |
| 2015/0019024 A1* | 1/2015 | Sabripour | G05D 23/1927 |
| | | | 700/276 |
| 2015/0282050 A1* | 10/2015 | Gosselin | H04W 52/0206 |
| | | | 370/329 |
| 2016/0124041 A1* | 5/2016 | Pathak | G01R 29/08 |
| | | | 324/629 |
| 2016/0241660 A1* | 8/2016 | Nhu | H04W 4/80 |
| 2017/0180984 A1* | 6/2017 | Thomas | H04W 12/02 |
| 2018/0095010 A1* | 4/2018 | Wewers | G01H 1/003 |
| 2018/0136085 A1* | 5/2018 | Lochry | G01M 5/0091 |
| 2018/0183990 A1* | 6/2018 | Chen | H04N 5/2258 |
| 2018/0213040 A1* | 7/2018 | Pak | H04L 67/141 |
| 2018/0284877 A1* | 10/2018 | Klein | G06F 1/3287 |
| 2018/0367617 A1* | 12/2018 | Moustafa | H04L 65/102 |

OTHER PUBLICATIONS

Lynch, Jerome P., and Kenneth J. Loh. "A summary review of wireless sensors and sensor networks for structural health monitoring." Shock and Vibration Digest 38, No. 2 (2006): 91-130.

Arms, S. W., J. H. Galbreath, A. T. Newhard, and C. P. Townsend. "Remotely reprogrammable sensors for structural health monitoring." In Structural Materials Technology Conference. 2004.

Paek, Jeongyeup, Krishna Chintalapudi, Ramesh Govindan, John Caffrey, and Sami Masri. "A wireless sensor network for structural health monitoring: Performance and experience." In emnets, pp. 1-9. IEEE, 2005.

Rice, Jennifer A., and Billie F. Spencer, Jr. "Flexible smart sensor framework for autonomous full-scale structural health monitoring." Newmark Structural Engineering Laboratory. University of Illinois at Urbana-Champaign., 2009.

Lloyd, Jason B., and Robert J. Connor. "Development and Verification of Web-based Bridge Monitoring Interface." (2013).

* cited by examiner

SENSOR AND MONITORING SYSTEM

CROSS REFERENCE TO RELATED APPLICATIONS

The present application claims the benefit of priority under 35 U.S.C. § 119 to U.S. Provisional Application No. 62/481,775, filed Apr. 5, 2017, entitled "SENSOR AND MONITORING SYSTEM," the disclosure of which is incorporated herein by reference in its entirety.

FIELD OF THE DISCLOSURE

The embodiments described herein relate generally to structural health monitoring. More specifically, the embodiments described herein relate to monitoring systems and methods for reduced power consumption and increased diagnostic abilities.

BACKGROUND

Description of the Related Art

Civil structures are subject to working loads and environmental forces that can compromise the structure's integrity and performance. For example, the structure's integrity may be affected by its age, maintenance, modification, and/or external forces such as local traffic, nearby construction, earthquakes, and strikes by vehicles. Collision detection monitoring, in particular, can provide information to determine whether a structure can still operate in its current condition, should be repaired, or should be replaced. Bridges over roadways may be struck by vehicles that exceed a height requirement. Bridges over waterways may be struck by vessels or debris within a watercourse.

Known systems rely on grid power. However, structures to be monitored may be remotely located and do not have access to a reliable power grid. For example, a railroad bridge may be located hundreds of miles from the nearest utility pole. In some instances, new power lines must be run to a bridge or other monitoring site in order to provide power to the system. Often, these costs far exceed the costs of the monitoring system and are time consuming. In other cases, grid power is available but it is unreliable. The power lines may be degraded, outdated, and provide inconsistent power. Although a technician may be able to connect into these power lines, the inconsistent power supply may harm components and/or the monitoring system may operate incompletely. In other instances, monitoring systems may be powered by portable generators but many disadvantages may still exist, such as increased power demands due to inherent inefficiencies, the need for additional hardware to convert between alternating current (AC) and direct current (DC) power, a larger footprint and size of the equipment, and reduced reliability associated with using an alternative power source for a system designed to be grid-powered. In addition, power lines may still need to be run from the generator onto the structure.

Known monitoring systems may be daisy-chained together. Several sensors are positioned along a structure and connected together using cabling. In some instances, more than 10 sensors may be connected together. These cable runs often exceed 1,000 feet. In busy locations, such as a highly-trafficked bridge, exceedingly long cable runs can be difficult to install and a technician attempting to run cables along a bridge can spend many hours waiting for a sufficient lapse in traffic to run an adequate length of cable. Additionally, longer cable runs and more pieces of equipment increase the time required for installation. Not only can increased installation time result in higher costs and increase the hazards faced by an installer, who must occupy the structure during setup, but the access required to install the equipment often impedes the functionality of the structure and can cause service interruptions.

Furthermore, monitoring sites are often visited by heavy equipment and work teams performing maintenance and/or construction, which can damage known systems or the cables connecting pieces of equipment. As the pieces of equipment are daisy-chained together, a damaged cable can render a large portion of a monitoring system non-operational. Likewise, the increased length of daisy-chained systems increases the potential for equipment damage from lightning strikes. In some installations, the cabling may be encased in conduit to prevent damage, which increases material and installation costs as well as the complexity of an installation.

Known systems may pull data from remotely mounted sensors. In order to contact the sensors, the system has a static internet protocol (IP) address. As a result, known systems may be repetitively attacked by hackers attempting to access the system. Each time an attempt reaches the known system, it may be evaluated and therefore increases the power consumption of the system. Known systems are often installed in remote or difficult to reach places. In addition, a lapse in service may occur without warning. When a system fails, due to a damaged cable, power loss, or other condition, a technician must travel to the monitoring site to examine the equipment to determine the failure. Other disadvantages of known systems exist.

SUMMARY

The present disclosure is directed to systems and methods that overcome some of the problems and disadvantages discussed above.

An embodiment of a system for monitoring integrity of a structure includes at least one sensor module and a gateway. The at least one sensor module is positioned to monitor the integrity of a structure. The gateway is in communication with the at least one sensor module. The gateway is configured to periodically receive data packets from the at least one sensor module and push the data packets to an offsite system. The at least one sensor module may be configured to periodically push the data packets to the gateway. The gateway may be configured to periodically pull the data packets from the at least one sensor module. The data packets may be pushed without receiving a request from the offsite system.

The system may include a solar power supply including batteries. The gateway may be configured to connect to a direct power supply. The gateway is configured to supply power to the at least one sensor module. The gateway may include an input selector configured to select between the solar power supply and the direct power supply. The system may include a communication module configured to transmit data packets over a communications link to the offsite system. The communication module may include a cell module having a dynamic IP address. The communication module may include a standby state and be configured to remain in the standby state until information is received from the gateway. In some embodiments, the communication module may be configured to periodically exit its standby state to transmit and receive data.

The system may include a Global Navigation Satellite System (GNSS) Module configured to obtain GNSS time data. The gateway may be configured to provide the GNSS time data to the at least one sensor module. The at least one sensor module may be a plurality of sensor modules. The gateway may be configured to synchronize measurements from the plurality of sensor modules using the GNSS time data. The gateway may be configured to relay the GNSS time data to the plurality of sensors and the plurality of sensors may use the GNSS time data to synchronize their measurements. Each of the plurality of sensor modules may be connected directly to the gateway. At least one of the plurality of sensor modules may include an image sensor and an illumination module. The illumination module may be configured to pulse at a frame rate of the image sensor.

An embodiment of a method for monitoring integrity of a structure includes collecting a plurality of measurements from at least one sensor module, the measurements being periodically received by a gateway. The at least one sensor module is positioned to monitor the integrity of a structure. The gateway may pull the measurements from the at least one sensor module. The at least one sensor module may periodically push the measurements to the gateway. The method includes pushing one or more data packets to an offsite system, the one or more data packets includes the plurality of measurements from the at least one sensor module. The one or more data packets may include maintenance data. The method may include determining an event, wherein the plurality of measurements correspond to the event. The plurality of measurements may include noisy measurements.

The data packet may be pushed to the offsite system via a communication module. The gateway may instruct the communication module to push the one or more data packets. The communication module may exit a standby state before pushing the data packet. The communication module may periodically exit the standby state upon instructions from the gateway to push the one or more data packets from the gateway. The communication module may push data packets via a cell module having a dynamic IP address. The method may include receiving data from the offsite system when the communication module is not in the standby state. The method may include determining a power failure and pushing a packet to the offsite system indicating the power failure by utilizing an uninterruptible power source. The method may include determining an event, wherein the data packet corresponds to the event. The method may include receiving an acknowledgement from the offsite system. The acknowledgement may be received by the communication module and relayed to the gateway. The gateway may also determine whether any data received by the communication module includes a request. The gateway may implement the request. The gateway may relay the request to the at least one sensor module. The at least one sensor module may determine whether any data received by the communication module includes a request. The at least one sensor module may implement the request. The request may indicate updated operating conditions and/or requests to send additional data. The method may include powering the at least one sensor module and gateway via a solar power supply. The method may include installing the gateway and sensor modules at a location without a grid-power supply.

An embodiment of a method for monitoring integrity of a structure includes collecting data from a plurality of sensor modules and time synchronizing at least a portion of the data from the plurality of sensor modules. The plurality of sensor modules are positioned to monitor the integrity of a structure. The portion of the data from the plurality of sensor modules includes a plurality of measurements and an another plurality of measurements. The method includes periodically routing the portion of the data from the plurality of sensor modules to the gateway. The gateway may be configured for bidirectional communication with the plurality of sensor modules. The method includes receiving the plurality of measurements to a communication module, the communication module exiting a standby state and transmitting the plurality of measurements to an offsite system without receiving a request from the offsite system to transmit the plurality of measurements, and receiving the another plurality of measurements to the communication module. After transmitting the plurality of measurements, the communication module reenters the standby state until receiving the another plurality of measurements. The communication module may exit the standby state and transmits the another plurality of measurements without receiving a request from the offsite system to transmit the another plurality of measurements. The gateway may periodically instruct the communication module to exit the standby state to transmit. After transmitting the plurality of measurements, the communication module may reenter the standby state until receiving a subsequent instruction from the gateway to exit the standby state.

The communication module may transmit the plurality of measurements via a cell module having a dynamic IP address. The method may include powering the plurality of sensor modules and the gateway via a solar power supply. When the communication module exits the standby state and transmits the another plurality of measurements, the communication module may receive data from the offsite system. The data received from the offsite system may indicate at least one of a successfulness of the transmission of the plurality of measurements, a set of updated operating conditions, or a request to send additional measurements. The data received from the offsite system may indicate a request to send additional measurements. The additional measurements may be raw data corresponding to an event in the plurality of measurements. The plurality of measurements may include maintenance data for the plurality of sensor modules, the communication module, or the gateway. The maintenance data may include values and/or statistics relating to a power demand of the gateway and the plurality of sensor modules. The maintenance data may include values and/or statistics relating to performance of the solar power supply. The maintenance data may include values and/or statistics relating to connections between the gateway and the plurality of sensor modules. The maintenance data may include a humidity level and/or a pressure level inside a house of one of the plurality of sensor modules or the gateway.

An embodiment of this disclosure is a monitoring system capable of operating in locations where abundant, high quality AC power is not available. The components of the monitoring systems are designed to be powered by an integrated power generation system that may be installed with the monitoring system.

Figure 1:
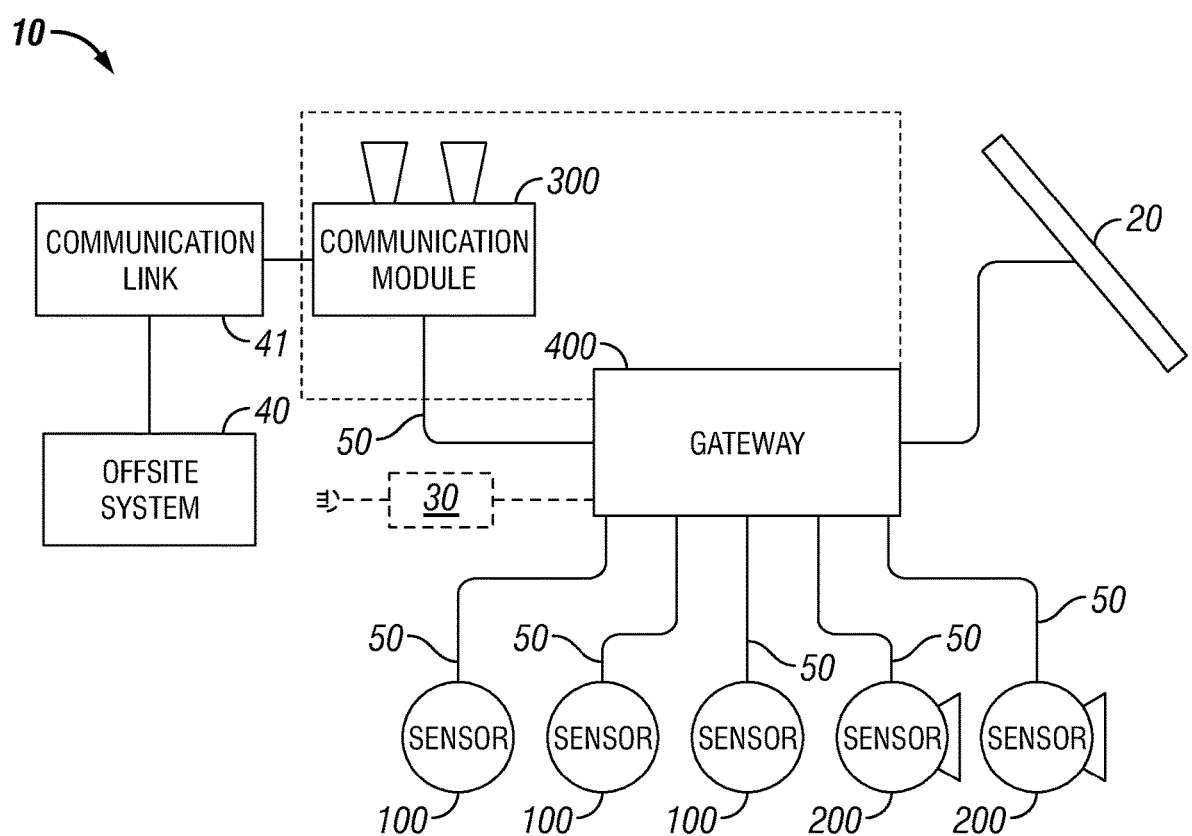
FIG. 1 shows an embodiment of a monitoring system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of a monitoring system 10. The monitoring system 10 includes sensor modules 100, 200, a communication module 300, and a gateway 400. The sensor modules 100, 200 may include accelerometers, inclinometers, temperature sensors, cameras, and/or other sensors. The sensor modules 100, 200 can be mounted to a structure in order to determine the health of the structure and measure working and environmental loads acting upon the structure. Data from the sensor modules 100, 200 may be transmitted to an offsite system 40, such as a server or computer terminal, for processing, analysis, or viewing. Data may be transferred over a communications link 41 between the offsite system 40 and the communication module 300. The communications link 41 represents generally any combination of cable, wireless, or remote connection via a telecommunication link, an infrared link, a radio frequency link, or any other connectors or systems that provides electronic communication between the offsite system 40 and the communication module 300. The sensor modules 100, 200, communication module 300, and gateway 400 may be configured to conserve energy and push data to the offsite system 40. Data may be pushed automatically without first receiving a request from the offsite system 40. The data may be stored and analyzed at the offsite system 40. The monitoring system 10 may be used to monitor and report settlement, subsidence, scour, vibration, seismic activity, collisions, deformation, alignment shifts, and other conditions.

Power is supplied to the gateway 400, which manages and supplies power to the sensor modules 100, 200 and the communication module 300. Cables 50 connect the gateway 400 to the sensor modules 100, 200 and the communication module 300. The cables 50 may be Cat6 cables with M12X connectors. The cables 50 connect each of the sensor modules 100, 200 directly to the gateway 400 such that if one of the cables 50 becomes compromised that it does not affect the connection to other sensor modules 100, 200 or communication module 300. In some embodiments, additional sensor modules 100, 200 may be connected to the sensor modules 100, 200 directly connected to the gateway 400.

Power is provided from the gateway 400 to the sensor modules 100, 200 or communication module 300 via the cables 50. In addition, the cables 50 may be capable of bi-directional communication. The gateway 400 routes data between the sensors modules 100, 200 and the communication module 300. Communications and requests from the offsite system 40 are directed to the gateway 400 of the monitoring system 10 via the communication module 300. The gateway 400 processes the requests and manages the sensor modules 100, 200. The gateway 400 may also modify the sampling rate or operation of the sensor modules 100, 200. Each of the sensor modules 100, 200 collects and processes measurements. The gateway 400 periodically collects data from the sensor modules 100, 200 to be transmitted to the offsite system 40. The collected data may include measurement data from the sensor modules 100, 200 and/or maintenance data from the sensor modules 100, 200, communication module 300, and gateway 400.

The communication module 300 may provide GNSS time data to the gateway 400. The GNSS time data is provided to each of the sensor modules 100, 200 by the gateway 400 and used to synchronize measurements. The GNSS time data may also be used to synchronize measurements from the monitoring system 10 with measurements from additional monitoring systems 10 positioned on the structure. A local real time clock 406 (shown in FIG. 5) of the gateway 400 may also be used to synchronize measurements from each of the sensor modules 100, 200 in the event that GNSS time data is unavailable. The local real time clock 406 may synchronize measurements from the monitoring system 10 but not with measurements from additional monitoring systems 10.

During the collection process, the communication module 300 may remain in a standby state to conserve energy. Rather than awaiting a request to pull data from the monitoring system 10, the gateway 400 periodically sends the collected data to the communication module 300 to be pushed to the offsite system 40. The communication module 300 exits standby and transmits the data. The communication module 300 may push the data once per minute. As the communication module 300 periodically pushes data rather than pulling data, the communication module 300 may operate in a standby state for longer periods and reduce power consumption. An acknowledgement of receipt may be received from the offsite system 40 by the communication module 300 and communicated to the gateway 400. Once the data transmission has been acknowledged, the transmitted data may be purged from the sensor modules 100, 200 and the communication module 300 may return to its standby state. In some embodiments, the communication module 300 may automatically re-enter its standby state and query whether the previous data transmission was successful when it next exits its standby state.

After transmitting the data, the communication module 300 may receive a request. The request may relate to specific operation of a component of the monitoring system 10 in order to diagnose operating inefficiencies or faults. The request may indicate modifications to the sampling rate or data processing by the sensor modules 100, 200. The modifications may be implemented by the gateway 400. The request may relate to a need for more particular data from at least one of the sensor modules 100, 200. For example, the transmitted data may indicate an event has occurred, such as a bridge strike. A user reviewing the transmitted data may determine that raw data, or higher resolution data, is needed to determine a more complete view of an event. In some embodiments, a request for raw data may be automatically determined based upon the information contained within the transmitted data. A request is relayed to the gateway 400 during the period when the communication module 300 is not in standby. The gateway 400 communicates instructions to the sensor modules 100, 200 to provide the requested data and then relays the data to the communication module 300 for transmission. In some embodiments, measurements from a sensor module 100, 200 may automatically trigger instructions for another sensor module 100, 200. By way of example, when measurements from a sensor module 100 exceed a predetermined threshold or an event is detected, the sensor module 100 may send an instruction to the other sensor modules 100, 200 to store corresponding data, to increase its sampling rate, and/or to send the corresponding data to the offsite system 40.

In addition, by connecting the sensor modules 100, 200 directly to the gateway 400, rather than daisy-chained together, the risk of damage from nearby lightning strikes is reduced, vulnerabilities to cable damage are reduced, and the time required to install the sensor modules 100, 200 is reduced. Also, on structures where additional monitoring is desired, an additional monitoring system 10 with a gateway 400 and sensor modules 100, 200 may be installed such that long cable runs are avoided.

Figure 5:
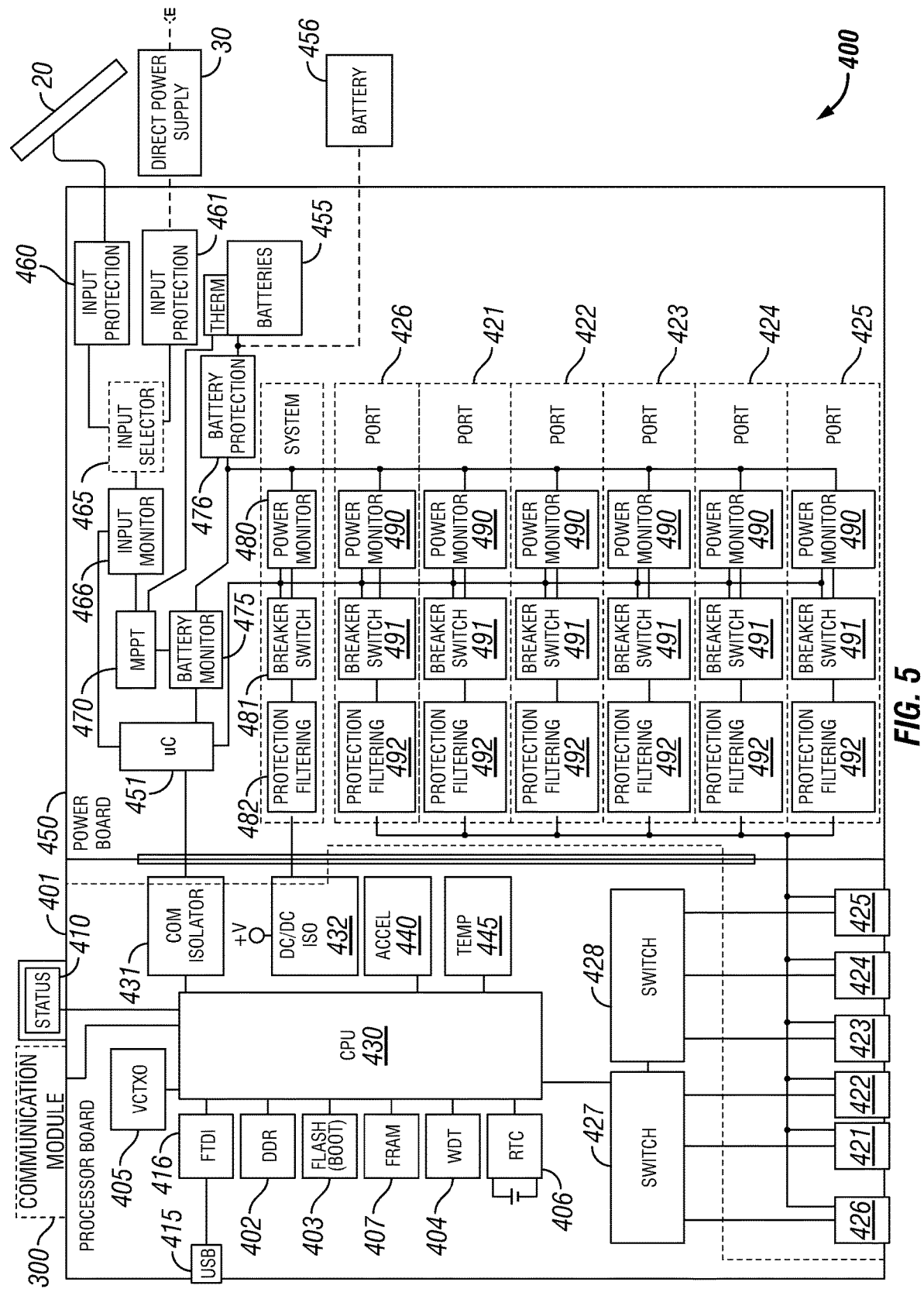
FIG. 5 shows a schematic diagram of an embodiment of a gateway.

The monitoring system 10 is connect to a power source. The power source may be an integrated power generation system configured to generate power from the surrounding environment. The integrated power generation system may be a solar power supply 20. The solar power supply 20 may include two solar panels. The power generation system may be sized to be mounted to the structure to be monitored. In some embodiments, solar panels of the solar power supply 20 may be mounted on or adjacent to the structure being monitored, such as within 50 feet of the gateway 400, for optimal placement for collecting solar radiation. In some embodiments, the integrated power generation system may be a wind system, such as a wind turbine; a hydropower system, such as a water turbine; or a piezoelectric source. The power generation system includes batteries 455 (shown in FIG. 5) for storing energy. The batteries 455 may be internal to the gateway 400, as shown in FIG. 5. The monitoring system 10 may be installed in locations where direct power may be non-existent or unreliable. The monitoring system 10 may be configured to conserve power to operate in locations where abundant, high quality AC power is not available. In addition, installation costs may be substantially reduced if an installer need not run power cables to a location to be monitored.

In some embodiments, the monitoring system 10 may be installed in a location where direct power supply 30, such as grid-powered energy, is available. The gateway 400 may be configured to connect to the direct power supply 30. The solar power supply 20 and batteries 455 may provide a secondary source of power for maintaining system operation when grid power becomes unavailable. For example, a bridge strike or earthquake may sever the direct power supply 30 to a monitoring system 10. The solar power supply 20 and batteries 455 may be used to maintain continuous operation through short and long-term power interruptions. In addition, if the power from the direct power supply 30 is of poor quality, the monitoring system 10 may be powered by the batteries 455 while the power from the direct power supply 30 is conditioned and used to recharge the batteries 455. Similarly, when the energy from the grid becomes interrupted, the monitoring system 10 continues to operate until the batteries 455 are depleted or the energy is restored to the monitoring system 10 either through the direct power supply 30 or the solar power supply 20.

Figure 2A:
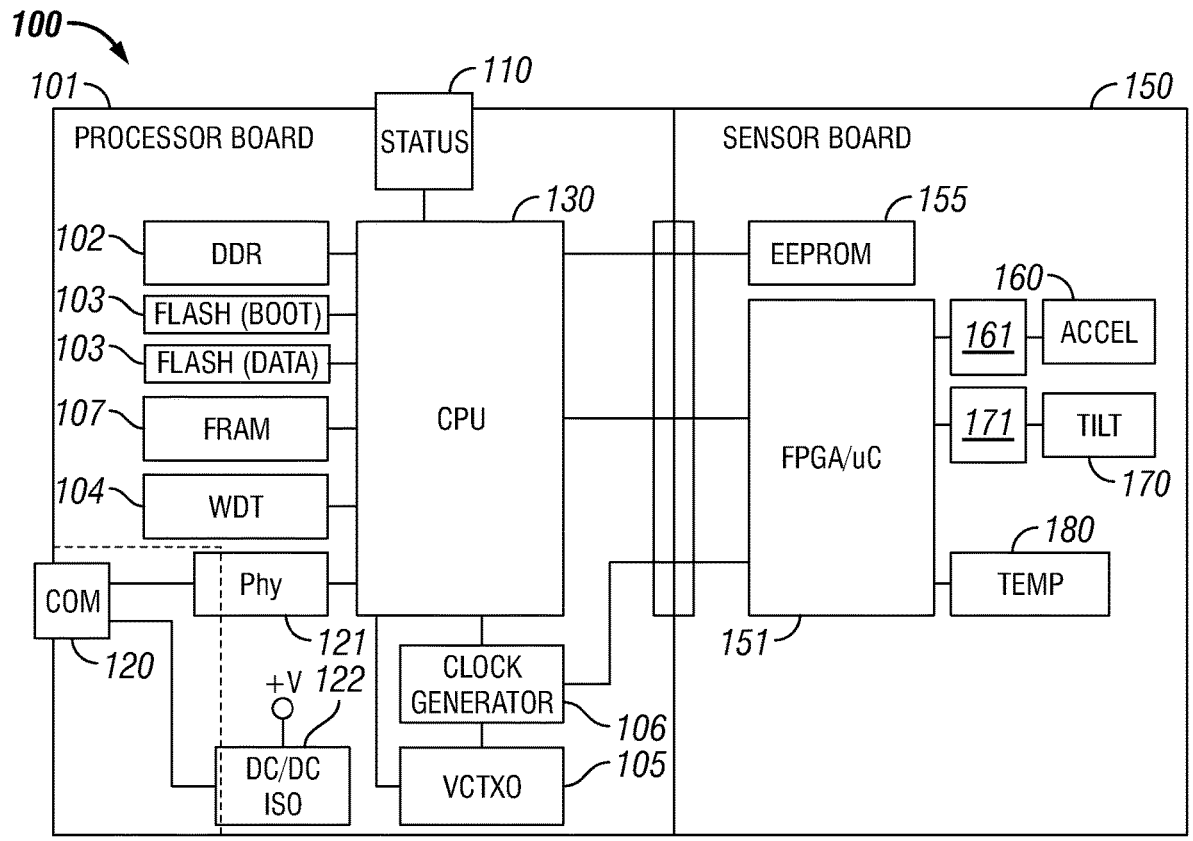
FIG. 2A shows a schematic diagram of an embodiment of a sensor module with an accelerometer and an inclinometer.
Figure 2B:
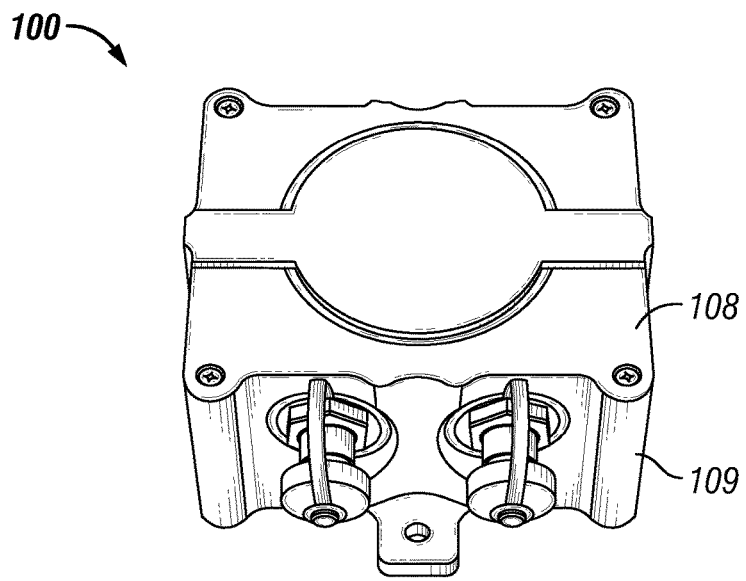
FIG. 2B shows an embodiment of an enclosure for a sensor module.

FIG. 2A shows a schematic diagram of an embodiment of a sensor module 100. FIG. 2B shows an enclosure comprising a lid 108 and a base 109 for housing the components of the sensor module 100 from harsh environmental conditions. The sensor module 100 may be positioned in locations that may become submerged in water, particularly after a collision, flooding, or other event has occurred that changes the structural integrity of the monitored structure. The enclosure may be formed to an IP67 or IP68 ingress protection rating.

As shown in FIG. 2A, the sensor module 100 includes a processor board 101 and a sensor board 150. The processor board 101 includes a communications port 120, a central processing unit 130, a status indicator 110, and a clock generator 106. The clock generator 106 may be integral to the central processing unit 130. The processor board 101 may include analog-to-digit converters, analog filters, random access memory (RAM) 102 for temporary data storage, flash memory 103 for boot and long term data storage, a watchdog timer 104, and/or a Voltage Controlled Temperature Compensated Crystal Oscillator ("VCTXO") 105. The VCTXO 105 may comprise part of the clock generator 106. The processor board 101 may include non-volatile memory 107, such as ferroelectric RAM, for updating system counters and storing system state information and maintenance data. The clock generator 106 may be derived from the VCTXO 105 and provide a timing reference for operation of the sensor module 100. The timing reference of the clock generator 106 may be used to index sensor data and determine the sampling rate for sensors on the sensor board 150. The status indicator 110 provides visual diagnostic information.

The status indicator 110 may be a light emitting diode. For instance, the status indicator 110 may emit solid light when power is received, blink slowly when a link with the gateway 400 (shown in FIG. 1) is established, blink rapidly when information is being transferred via the link, emit a second color or pattern when the sensor module 100 has experienced a failure, and/or emit a third color or pattern when a cable 50 (shown in FIG. 1) has become damaged and is not transmitting data or power correctly.

The communications port 120 may include a power supply 122 to receive power for the sensor module 100. The power supply 122 may be an isolated power supply. The power from the power supply 122 may be further routed to portions of the sensor module 100 as would be appreciated by one of ordinary skill in the art having the benefit of this disclosure. The communications port 120 is also capable of bi-directional communication with the gateway 400 to transmit sensor data. The communications port 120 may include a physical transceiver layer 121 to relay the data to the central processing unit 130 of the sensor module 100. The central processing unit 130 implements requests from the gateway 400 and prepares sensor data to be transmitted to the gateway 400. The central processing unit 130 may also collect maintenance data. For example, the maintenance data may include the state of the status indicator 110, transmission speeds, electrically erasable programmable read-only memory (EEPROM) information, and performance counters. The performance counters may include the number of hours operated or the number of power cycles of the sensor module 100. The maintenance data may be stored in the non-volatile memory 107. The maintenance data may be transmitted periodically, as part of the sensor data or separate, to aid in diagnosing and/or predicting a fault of the sensor module 100.

The sensor board 150 may monitor dynamic response, static responses, and temperature conditions, among other conditions. The sensor board 150 includes sensors and an integrated circuit 151. The integrated circuit 151 may be a field programmable gate array or a microcontroller as would be understood by one of ordinary skill in the art having the benefit of this disclosure. The sensors of the sensor board 150 are in communication with the integrated circuit 151. The integrated circuit 151 may simultaneously sample each sensor in the sensor module 100. The integrated circuit 151 packetizes the data and relays the packetized data to the central processing unit 130 of the processor board 101. The sensor board 150 includes an EEPROM 155 containing the sensor module 100 part number, manufacturing information, and calibration table. As shown, the sensors of the sensor board 150 may include an accelerometer 160, an inclinometer 170, and a temperature sensor 180. The accelerometer 160 may include a voltage translator 161. The inclinometer 170 may include an analog to digital converter 171. The accelerometer 160 measures three-dimensional dynamic responses related to vibration, impact, shock, and displacement, while the inclinometer 170 measures tilt and attitude. The inclinometer 170 readings are taken along at least one inclinometer 170 axis, and the accelerometer 160 readings are taken along at least one accelerometer 160 axis. At least one axis may be common between the inclinometer 170 and the accelerometer 160. The inclinometer 170 may take readings along two axes and the accelerometer 160 may take readings along three axes. The temperature sensor 180 measures a local temperature. The temperature sensor 180 may be used to compensate for readings of other sensors and/or to provide local temperature data for the attached structure. In addition, the temperature sensor 180 may provide data to be incorporated in the maintenance data to assess equipment condition.

The clock generator 106 produces a sampling clock and timing reference for the accelerometer 160, inclinometer 170, and temperature sensor 180. The sampling clock and timing reference is provided to the integrated circuit 151 and relayed to the accelerometer 160, inclinometer 170, and temperature sensor 180. GNSS time data or time data from the gateway 400 (shown in FIG. 1) may be used such that all sensors of each sensor module 100 are synchronized.

The sensor data is processed and packetized by the integrated circuit 151 and relayed to the central processing unit 130. Raw data and processed data may be stored in the flash memory 103. The flash memory 103 may store up to a week of data packets if the communications link 41 (shown in FIG. 1) is down. In some embodiments, the flash memory 103 may store more than a week of data packets. The packetized data may include maintenance data in a single or separate packet. The packetized data may be temporarily stored in the RAM 102 until the central processing unit 130 transmits the packetized data to the gateway 400 via the communications port 120. Once the packetized data has been successfully transmitted to the offsite system 40 (shown in FIG. 1), the packet may be overwritten or otherwise purged from the sensor module 100. Raw data may be stored within flash memory 103 in a ring buffer, as would be appreciated by one of ordinary skill in the art having the benefit of this disclosure. In some instances, raw data may be requested by the gateway 400 and transmitted via the communications port 120 by the central processing unit 130.

Measurements from a sensor module 100 may normally be "quiet." For instance, sensor readings may be minimal during a time when there are no working or environmental loads acting upon a structure or the readings are within an accepted range. By way of example, readings for a bridge may be quiet when there is no traffic on the bridge. Also for example, readings on an overpass may be quiet during periods when there are normal and customary vibrations from traffic. Additionally, sensor modules 100 may have different accepted ranges based upon their application. For instance, an inclinometer upon a building being constructed could have a smaller acceptable range than an inclinometer placed upon a bascule bridge. Likewise, acceptable ranges may depend upon the axis being measured. In order to conserve energy, if the measurements are quiet, the processing of the data may be minimized. However, when readings become noisy, the processing of the data may be conducted normally.

Readings may become "noisy" when the measurements exceed the predetermined value or accepted range. For example, measurements may become noisy when a vessel collides with a bridge, a railroad locomotive passes over a bridge, or construction on a nearby building causes vibrations within neighboring structures. Likewise, a tractor and trailer may collide with an overpass causing vibrations and deflections to exceed what is usual. The sensor module 100 may include programming to filter out quiet measurements and transmit only noisy measurements. As quiet measurements are filtered out, the monitoring system 10 may further reduce power consumption by not unnecessarily transmitting data of little relevance. The sensor module 100 may be programmed to process the data into data streams under different conditions, which is packetized and transmitted to the gateway 400. The data streams may include an epoch data stream, a raw data stream, a peak particle velocity (PPV) data stream, an event data stream, or combinations thereof. A raw data stream includes raw data from the sensors 160, 170, 180 within the sensor module 100. The raw data stream may be stored locally within the sensor module 100. When more details are needed, a user may request the raw data stream. However, continuous transmittal of raw data is power intensive and therefore may be reserved to specific requests. An epoch data stream includes data over a period of time. For example, an epoch data stream may correspond to measurements over a minute. A PPV data stream includes peak particle velocity (PPV) data.

An event data stream breaks a continuous data stream into discrete events. An event begins when the measurements become noisy and ends when the measurements return to quiet. Statistics of the event are generated and formed into an event packet for transmission to the remote location. During the event, raw data is stored to be accessed upon request. The event may not be aligned with predetermined intervals. For example an event may span multiple epochs or an epoch may include multiple events. The event packet provides a more detailed view of the start and stop times of events so that more accurate and complete analysis may be conducted. Furthermore, the event data stream may be correlated to other data such as camera or video images in order to provide a more comprehensive overview of an event. In addition, the event data may alleviate the need to pull and further process multiple epochs.

Figure 3A:
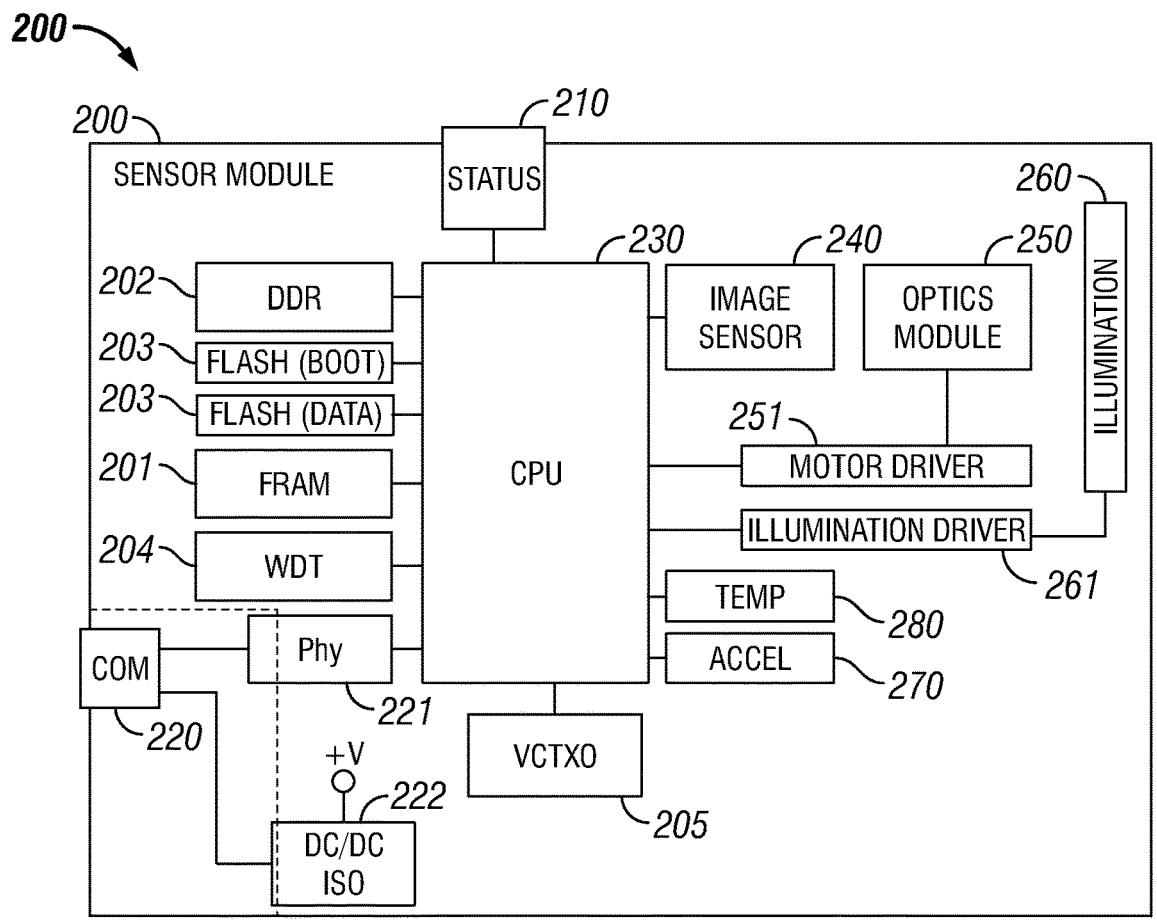
FIG. 3A shows a schematic diagram of an embodiment of a sensor module with an image sensor.

FIG. 3A shows a schematic diagram of an embodiment of a sensor module 200 configured to provide visual data. The sensor module 200 includes an enclosure 207 (shown in FIG. 3B) for housing the components of the sensor module 200 from harsh environmental conditions. The enclosure may be formed to an IP66, IP67, or IP68 ingress protection rating.

The sensor module 200 includes a communications port 220, a central processing unit 230, a status indicator 210, an image sensor 240, an optics module 250, and an illumination module 260. The sensor module 200 may include analog-to-digit converters, analog filters, RAM 202, flash memory 203 for boot and long term data storage, a watchdog timer 204, and/or a VCTXO 205. The sensor module 200 may include non-volatile memory 201, such as ferroelectric RAM, for updating system counters and storing system state information and maintenance data.

The VCTXO 205 provides a timing reference for operation of the sensor module 200. The status indicator 210 provides visual diagnostic information. The status indicator 210 may be a light emitting diode. For instance, it may emit solid light when power is received, blink slowly when a link is established with the gateway 400 (shown in FIG. 1), blink rapidly when information is being transferred via the link, emit a second color or pattern when the sensor module 200 has experienced a failure, and/or emit a third color or pattern when a cable 50 (shown in FIG. 1) has become damaged and is not transmitting data or power correctly.

The communications port 220 may include a power supply 222 to receive power for the sensor module 200. The power supply 222 may be an isolated power supply. The communications port 220 is also capable of bidirectional communication with the gateway 400 to transmit data from the sensor module 200. The communications port 220 may include a physical transceiver layer 221 to relay the data to the central processing unit 230 of the sensor module 200. The central processing unit 230 implements requests from the gateway 400 and prepares sensor data to be transmitted to the gateway 400. The central processing unit 230 may also collect maintenance data for the sensor module 200. The maintenance data may be stored in the non-volatile memory 201. For example, the maintenance data may include the state of the status indicator 210, transmission speeds, and performance counters. The performance counters may include the number of hours operated or the number of power cycles of the sensor module 200. The maintenance data may be transmitted periodically, as part of the sensor data or separate, to aid in diagnosing a fault of the sensor module 200.

The image sensor 240 is capable of providing visual data. For remote installation where grid power is unavailable, the image sensor 240 may be a class 1 camera capable of taking still images. For installations where direct power is available, the image sensor 240 may be a class 1 camera, a class 2 camera capable of taking videos, or a class 3 camera with machine vision capabilities. The image sensor 240 may be a sensor with a frame rate of about 10 frames per second. The image sensor 240 is configured to minimize power usage and enter a standby state when not in use. The image sensor 240 may include a color daylight mode and an infrared night vision mode. The optics module 250 may include a motorized zoom and focus, motorized iris, and motorized infrared cut filter. A motor driver 251 may be used to operate the zoom, focus, and filter functions of the optics module 250. The illumination module 260 is capable of illuminating a target region to be imaged by the sensor module 200. An illumination driver 261 may operate the illumination module 260. The illumination module 260 may be an infrared (IR) light source, such as an IR ring illuminator, to illuminate a target region for taking images in the night vision mode. The infrared light source is synchronized with the frame rate of the image sensor 240 and minimizes power consumption.

The sensor module 200 collects and processes visual data. The visual data may be stored locally on the sensor module 200 within flash memory 203 in a ring buffer, as would be appreciated by one of ordinary skill in the art having the benefit of this disclosure. A reference image or subset of the visual data may be periodically relayed to the gateway 400 to be transmitted to the offsite system 40 (shown in FIG. 1). The reference image or subset of the visual data may be temporarily stored in the RAM 202 until the central processing unit 230 transmits the data to the gateway 400 via the communications port 220. Once the data has been successfully transmitted to the offsite system 40, the data may be overwritten or otherwise purged from the sensor module 200. Raw data may continue to be stored within the flash memory 203 in a ring buffer.

Figure 3B:
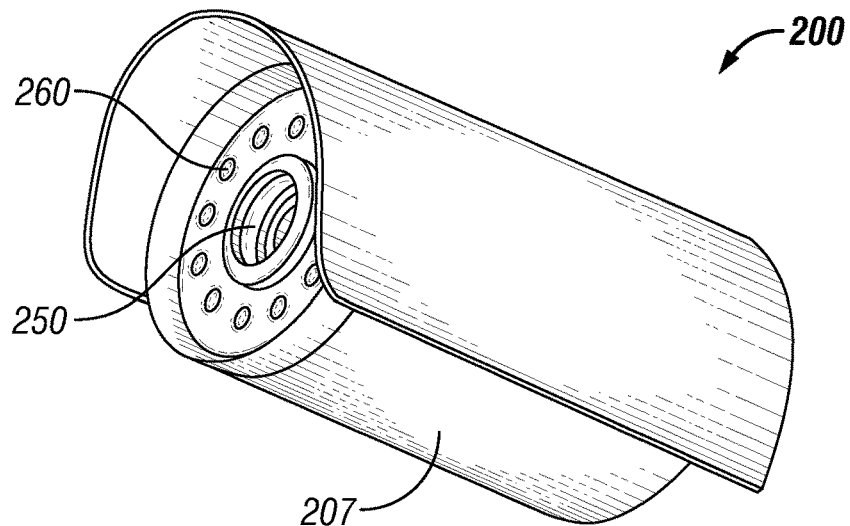
FIG. 3B shows an embodiment of a sensor module with an image sensor.

The sensor module 200 may include an accelerometer 270 capable of indicating the vibration and shock experienced by the camera sensor. The sensor module 200 may include a temperature sensor 280 capable of measuring the internal temperature of the sensor module 200. Measurements from the accelerometer 270 and temperature sensor 280 may be incorporated with the maintenance data to assess equipment functionality. The maintenance data may be transmitted periodically, as part of a packet with the visual data or separate, to aid in diagnosing and/or predicting system faults. FIG. 3B shows an embodiment of the sensor module 200 with the illumination module 260 surrounding the optics module 250 and encased in an environment resistant enclosure 207.

Figure 4:
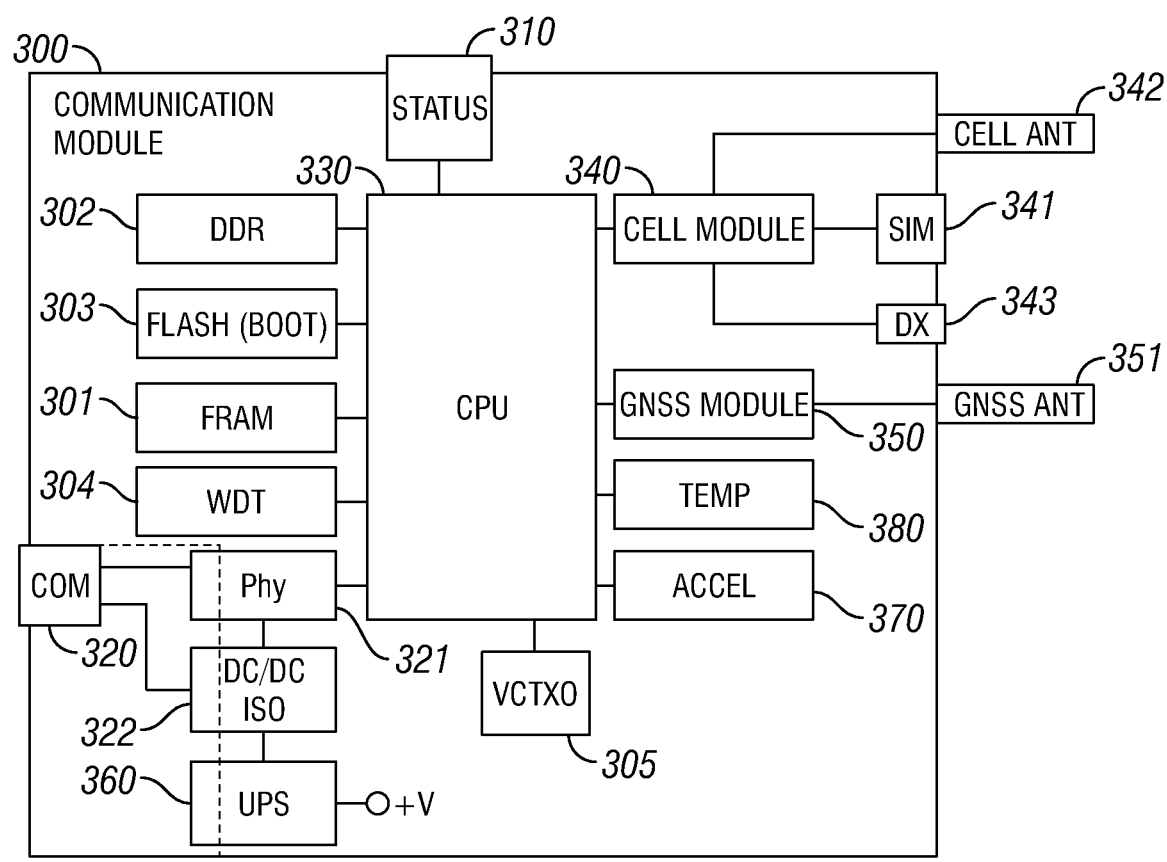
FIG. 4 shows a schematic diagram of an embodiment of a communication module.

FIG. 4 shows a schematic diagram of an embodiment of a communication module 300. The communication module 300 is configured to transmit and receive data over a communications link 41 (shown in FIG. 1), such as a cellular network. The communication module 300 includes a communications port 320, a central processing unit 330, a status indicator 310, a GNSS module 350, and a cellular module 340 and cell antenna 342. The communication module 300 may include analog-to-digit converters, analog filters, RAM 302, flash memory 303, a watchdog timer 304, and a VCTXO 305. The communication module 300 may include non-volatile memory 301, such as ferroelectric RAM, for updating system counters and storing system state information and maintenance data. The status indicator 310 provides visual diagnostic information from the communication module 300. For instance, it may emit solid light when power is received from the gateway 400 (shown in FIG. 1), blink slowly when a communications link 41 (shown in FIG. 1) is established, blink rapidly when information is being transferred via the cellular link, emit a second color or pattern when a link is established with the gateway 400, and/or emit a third color or pattern when a cable 50 (shown in FIG. 1) has become damaged and is not transmitting data or power correctly.

The communications port 320 includes a power supply 322 to receive power for the communication module 300. The power supply 322 may be an isolated power supply. The communications port 320 also provides data to and receives data from the gateway 400. The communications port 320 may include a physical transceiver layer 321 to relay the data to the central processing unit 330 of the communication module 300.

The GNSS module 350 provides GNSS time data to the communication module 300. The GNSS module 350 may also be configured to provide positional data. The GNSS module 350 may include an external GNSS antenna 351 to improve signal reception. In some embodiments, the GNSS module 350 may be incorporated into the gateway 400 instead of the communication module 300, as would be appreciated by one of ordinary skill in the art having the benefit of this disclosure. The GNSS time data is used to time reference sensor data before transmission. The GNSS time data may be provided to gateway 400 and further provided to the sensor modules 100, 200 (shown in FIG. 1). Data from different sensor modules 100, 200 may be time referenced with the GNSS time data so that the measurements are synchronized. The GNSS time data may be used to synchronize data from different gateways 400 and sensor modules 100, 200 on the same structure. The cellular module 340 and cell antenna 342 are configured to transmit data over a cellular network. The cellular module 340 may be a 4G modem with 3G fallback. The cellular module 340 may include a SIM card socket 341 to receive a network SIM card. The cell antenna 342 may be directly mounted on a housing (not shown) of the communication module 300. The communication module 300 may include a diversity antenna connection 343 capable of connecting a remotely mounted antenna to improve the quality and reliability of the cellular link. The remotely mounted antenna may be positioned at or within two feet of the housing of the communication module 300.

The communication module 300 receives data over a cellular network and provides the data to the gateway 400. Similarly, data received from the gateway 400 is transmitted over the cellular network. When not transmitting or receiving, the communication module 300 is placed in standby state to conserve power until it receives information from the gateway 400. In some embodiments, the communication module 300 may be configured to periodically exit its standby state to transmit and receive data. For example, the communication module 300 may exit its standby state for five seconds or less each minute to determine whether a previous data packet successfully transmitted, transmit a new data packet, and/or receive any requests from the offsite system 40. Periodically, as instructed by the gateway 400, the communication module 300 may check for requests from the offsite system 40 to determine whether additional data should be pulled and transmitted.

The central processing unit 330 may also collect maintenance data for the communication module 300. The maintenance data may be stored in the non-volatile memory 301. The communication module 300 may include an accelerometer 370 capable of indicating the vibration and shock experienced by the communication module 300. The communication module 300 may include a temperature sensor 380 capable of measuring the internal temperature of the communication module 300. Measurements from the accelerometer 370 and temperature sensor 380 may be incorporated with the maintenance data to assess equipment functionality. The maintenance data may be transmitted periodically, as part of a packet of sensor data or separate, to aid in diagnosing and/or predicting a fault of the communication module.

The communication module 300 may be configured to connect to a virtual private network (VPN) and have a dynamic IP address. Unlike known systems that receive periodic pull requests, the communication module 300 pushes data periodically and may query for additional pull requests. The dynamic IP address may enable the system to conserve power and avoid attacks by hackers that would otherwise wake the system and force a response. It is appreciated that some embodiments described herein may be compatible with a static IP address.

The communication module 300 includes an uninterruptible power source (UPS) 360, such as a supercapacitor. When power from or communication with the gateway 400 is lost, the communication module 300 utilizes the energy in the UPS 360 to transmit a distress signal to the offsite system 40 (shown in FIG. 1) to indicate the failure event. Accordingly, a user at a remote location can determine whether an interruption in information is a result of a power failure.

FIG. 5 shows a schematic diagram of an embodiment of a gateway 400. The gateway 400 includes a processor board 401 and a power board 450. The processor board 401 includes a plurality of sensor communication ports 421-425, an antenna communications port 426, a central processing unit 430, a status display 410, and a VCTXO 405. The processor board 401 may include analog-to-digit converters, analog filters, RAM 402, flash memory 403, a watchdog timer 404, a local interface 415 such as a USB port and a serial converter 416 for local configuration and diagnostics of the monitoring system 10 via the gateway 400. The local interface 415 may be password protected to deter unauthorized access. The gateway 400 may include non-volatile memory 407, such as ferroelectric RAM, for updating system counters and storing system state information and maintenance data.

The status display 410 may be an LCD screen with memory display technology such as electronic ink. The status display 410 is capable of updating the LCD screen while using minimal power. The status display 410 is configured to display error codes and other information such as system health, power and communications statuses for each port 421-426, and energy status for the solar power supply 20 and batteries 455, 456. The status display 410 may be protected behind a translucent layer, such as gorilla glass, in a housing of the gateway 400.

The antenna communications port 426 receives a cable 50 (shown in FIG. 1) to enable communication between the communication module 300 (shown in FIG. 1) and the gateway 400. The plurality of sensor communication ports 421-425 each receive a cable 50 (shown in FIG. 1) to enable communication between the sensor modules 100, 200 (shown in FIG. 1) and the gateway 400. The antenna communications port 426 and sensor communication ports 421-425 may each be a M12-X connector. The gateway 400 act as a firewall for the monitoring system 10 and filters traffic received through the antenna communications port 426 and restricts data through the sensor communication ports 421-425 to authorized data.

The gateway 400 interprets instructions received through the antenna communications port 426 and collects sensor data received through the sensor communication ports 421-425. GNSS time data is provided to the gateway through the antenna communications port 426. The GNSS time data may be used to synchronize measurements of each sensor module 100, 200 (shown in FIG. 1) connected to the sensor communication ports 421-425. The measurements may also be synchronized with measurements from additional monitoring systems 10. The gateway 400 may include a battery operated real time clock 406. The real time clock 406 provides a timing reference for operation of the monitoring system 10 (shown in FIG. 1) when GNSS time data is unavailable. The gateway 400 may interpret the instructions received through the antenna communications port 426 to change the sampling rate, data processing, or operation of the sensor modules 100, 200.

The collected sensor data may include sensor measurements and/or maintenance data. The central processing unit 430 may also collect internal maintenance data of the gateway 400, such as power usage and operating parameters. The maintenance data of the gateway 400 may be stored in the non-volatile memory 407. The gateway 400 may include an accelerometer 440 capable of indicating the vibration and shock experienced by the gateway 400. The gateway 400 may include a temperature sensor 445 capable of measuring the internal temperature of the gateway 400. Measurements from the accelerometer 440 and temperature sensor 445 may be incorporated with the maintenance data to assess equipment functionality. The maintenance data may be transmitted periodically, as part of a packet of sensor data or separate, to aid in diagnosing and/or predicting a fault of the gateway 400. In some embodiments, the gateway 400 may also function as a sensor module 100 and/or a sensor module 100 may be incorporated into the gateway 400. Measurements collected from the gateway 400 may be used for assessing equipment functionality, for measuring the response of a structure as a result of external forces, or both.

Sensor data may be held locally in RAM 402 of gateway 400, but not stored. Instead, sensor data may be retrieved from the sensor modules 100, 200 (shown in FIG. 1) through the sensor communication ports 421-425 if desired. Periodically, the gateway 400 sends collected data through the antenna communications port 426 to the communication module 300 (shown in FIG. 1) to push the collected data to the offsite system 40 (shown in FIG. 1). In some embodiments, the communication module 300 may be replaced with or supplemented by a local area network. If the collected data is unable to be transmitted, because there is no cellular service or the connection to the communication module 300 has become compromised for example, the data is stored locally on the sensor modules 100, 200 (shown in FIG. 1) until it is able to be transmitted or locally extracted.

Once the collected data is transmitted, an acknowledgement may be received from the remote location by the communication module 300 (shown in FIG. 1) and communicated to the gateway 400 via antenna communications port 426. Once the data transmission has been acknowledged, the collected data may be purged from the RAM 402 of the gateway 400 and from the sensor modules 100, 200. However, in some embodiments, raw data is maintained in the sensor modules 100, 200 until it is purged by a ring buffer. Raw sensor data and maintenance data that has not been purged may be accessed upon request from the gateway 400.

The gateway 400 includes data switches 427, 428 connecting the antenna communications port 426 and sensor communication ports 421-425. The data switches may be Ethernet switches that support Energy-Efficient Ethernet to reduce power consumption during periods of low data activity. Each communication port 421-426 may include an Ethernet transformer. The data switches 427, 428 may be divided so that a portion of the sensor communication ports 421-425 may be shutdown to conserve power when no sensor module 100, 200 is connected or the available power drops below a predetermined level. The data switches 427, 428 may be configured to prevent cross-port communications. The data switches 427, 428 may support Media Access Control Security (MACsec) for encrypting and authenticating a communication module 300 and sensor modules 100, 200 (shown in FIG. 1) attached to the gateway 400.

The power board 450 is configured to manage power for the gateway 400 and components connected to the gateway 400. A communications interface 431 may be used to provide communications between the processor board 401 and the power board 450. The communications interface 431 may be an isolated communications interface. The power board 450 includes an integrated circuit 451, such as a field programmable gate array or microcontroller, configured to manage power received from a solar power supply 20 or direct power supply 30. The power board includes a solar input protection module 460 configured to protect the gateway 400 from external threats on the solar power supply 20 and a direct power input protection module 461 configured to protect the gateway 400 from external threats on the direct power supply 30. External threats may include incorrectly wired power supplies, reversed polarity, shorts in wiring, transients such as lightning, and filtering, and overvoltage. An input selector 465 may be used to select between available power sources. The input selector 465 may prioritize direct power over solar power when direct power is available. An input monitor 466 is configured to monitor the power supplied to the gateway 400. In some embodiment, the input may be manually selected at the time of installation.

The gateway 400 includes batteries 455 for storing power for use during periods when additional power is not being supplied. In some embodiments, the batteries 455 are internal to the gateway 400 and/or may include additional external battery packs 456 to store additional power. Additional external battery packs 456 may be particularly well-suited for cold environments or environments where exposure to solar radiation may be inconsistent. The batteries 455, 456 may be configured to store sufficient energy to operate the monitoring system for an extended period of time such as, but not limited to up to 5 days. The power board 450 includes a charge management controller 470 for charging batteries 455, 456. The charge management controller 470 may use a Maximum Power Point Tracking algorithm to manage charging of the batteries 455, 456. The power board 450 may include a battery monitor 475 and battery protection module 476 to monitor the power supplied and drawn from the batteries 455, 456 and to protect the processor board from faults from the batteries 455, 456.

The power board 450 is configured to provide power to a power supply 432. The power supply 432 may be an isolated power supply. The power supply 432 may serve as a power management integrated circuit for the central processing unit 430. A system power chain to the power supply 432 may include a power monitor 480, breaker switch 481, and protection filtering module 482. The power monitor 480 monitors the power usage of the system, including voltage, current, and watts. The power monitor 480 may also include a local monitor for monitoring the power usage of the power board. Periodically, the power monitor 480 reports power usage data to the central processing unit 430. The power usage data may be incorporated into the maintenance data for the gateway 400. The breaker switch 481 changes the power on and off. The breaker switch 481 may provide overcurrent protection and create a counter for maintenance data each time it is operated. In addition, the breaker switch 481 may be configured to update the status display 410 when it is activated. The protection filtering module 482 is configured to perform bidirectional filtering, such as noise and electromagnetic interference filtering, and/or protect against a reverse drive condition and transients, such as lightning, electrostatic discharge, and electrical fast transients.

The power board 450 is configured to provide power to the antenna communication port 426 and sensor communication ports 421-425 to power the communication module 300 and sensor modules 100, 200 (shown in FIG. 1) connected thereto. A port power chain to each of the communication ports 421-426 may include a power monitor 490, breaker switch 491, and protection filtering module 492. The port power chain is described with respect to sensor communication port 421 connected to a sensor module 100, but a person of ordinary skill in the art will appreciate that communication ports 422-426 may also apply. The power monitor 490 monitors the power usage of the sensor module 100 through sensor communication port 421, including voltage, current, and watts. The power usage indicates the power consumption and operating condition of the sensor module 100 connected to the sensor communication port 421. Power monitor 490 for antenna communication port 426 would indicate the power consumption and operating condition of the communication module 300 (shown in FIG.

1) connected to antenna communication port 426. Periodically, the power monitor 490 reports power usage data to the central processing unit 430. The power usage data may be incorporated into the maintenance data for the connected sensor module 100.

The power monitor 490 may be configured to disable or prioritize particular sensor communication ports 421-425 when available power is below a predetermined level. For example, if the available power supplied from battery 455 drops below a first level, the power monitor 490 of sensor communication ports 423-425 may interrupt the power supply to these sensor communication ports 423-425. Sensor communication ports 421 and 422 may be prioritized to continue operating. Therefore, although less sensor modules 100, 200 are active, the period of monitoring may be extended despite the lower available power. In addition, the power monitor 490 may notify the central processing unit 430 to communicate the power level to the offsite system 40 (shown in FIG. 1) and update the status display 410 to show the available power has dropped below the first level. If the available power supplied from battery 455 drops below a second level, the power monitor 490 of sensor communication ports 421, 422 may interrupt the power supply to these sensor communication ports 421, 422. All available power may be supplied to antenna communication port 426 to operate the communication module 300 and transmit the battery 455, 456 status to the offsite system 40 (shown in FIG. 1). In addition, the power monitor 490 may notify the central processing unit 430 to communicate the power level to the offsite system 40 (shown in FIG. 1) and update the status display 410 to show the available power has dropped below the second level.

The breaker switch 491 changes the power on and off to the sensor communication port 421. The breaker switch 491 may provide overcurrent protection and create a counter for maintenance data each time it is operated. In addition, the breaker switch 491 may be configured to update the status display 410 when it is activated. The protection filtering module 492 is configured to perform bidirectional filtering, such as noise and electromagnetic interference filtering, and/or protect against a reverse drive condition and transients, such as lightning, electrostatic discharge, and electrical fast transients.

The gateway 400 includes a system manager for managing components within the monitoring system 10. The system manager may be implemented by the central processing unit 430 and/or the integrated circuit 451. In some embodiments, the system manager may be implemented by the combination of the central processing units 130, 230, 330, 430 of the sensor modules 100, 200, communication module 300, and gateway 400. The system manager periodically surveys the sensor modules 100, 200, communication module 300, and gateway 400 to determine whether any fault conditions exist. The system manager may access and include the collected maintenance data for the sensor modules 100, 200, communication module 300, and gateway 400. The system manager may create a monitoring packet to be transmitted in place of, or in addition to, the maintenance data.

The system manager may include a power monitoring protocol to monitor the current power demands for the gateway 400 and sensor modules 100, 200. The power monitoring protocol calculates values and/or statistics for the current power demands of the monitoring system 10, the current power generation capacity and performance of the power supplies 20, 30, and the current stored power level and available capacity of the batteries 455, 456. The system manager may include a communications monitoring protocol. The communications monitoring protocol calculates values and/or statistics for the connection quality of the sensor modules 100, 200 and the communication module 300 with the gateway 400. The values and statistics may include inbound and outbound data transfer rates. The values and statistics may include inbound and outbound data transfer rates of the communications link 41 between the offsite system 40 and the communication module 300. The communications monitoring protocol may determine whether a cable 50 is shorted, not connected, or improperly terminated. The system manager may receive data from the accelerometers 270, 370, 440 and temperature sensors 180, 280, 380, 450 in the gateway 400, sensor modules 100, 200, and communication module 300 to determine whether the equipment has been exposed to large temperature fluctuations, significant shock, or vibration. The system manager may utilize prediction curves to estimate further conditions and the effects on the monitoring system 10.

Periodically, the system manager instructs the communication module 300 to transmit the monitoring packet to a maintenance manager. The monitoring packet may be transmitted with sensor measurement data. The maintenance manager may be accessible through or located at the offsite system 40. In some embodiments, the maintenance manager may be accessible through or located at the gateway 400. If no faults are found, the system manager updates the status display 410 and the maintenance manager. If faults are found, the system manager may determine whether adjustment of the monitoring system 10 is needed and update the status display 410 and the maintenance manager. A technician may utilize the maintenance manager to determine what materials are needed to repair a fault or to prevent a future fault. For example, a technician may be informed that a cable 50 has been damaged between the gateway 400 and a sensor module 200 connected to the fourth sensor communication port 424. Also for example, a technician may be informed that the communication module 300 has been positioned in a location that is subject to large temperature fluctuations, significant shock, or vibration and should be repositioned to prevent harm to the communication module 300.

The maintenance manager manages the condition of the monitoring system 10. The maintenance manager analyzes the information from the system manager to identify undesirable traits or trends that may indicate a need for maintenance. For example, if the maintenance manager determines that a change should be implemented, a maintenance notification may be dispatched to a technician. The maintenance manager may be configured to receive information from additional monitoring systems and manages the condition of each monitoring system. The maintenance manager may implement software updates for the monitoring system 10. Unlike known systems, the maintenance manager may inform an individual without physical access to the monitoring system 10 of a cause of failure.

The system manager and maintenance manager work together to identify the cause of faults and potential causes of future faults of portions of the monitoring system 10. For example, a solar power supply 20's efficiency can degrade due to changes in the local environment such as solar panel orientation, a solar panel becoming obscured by surface contaminates, or solar panel damage. The system manager may periodically record values and statistics related to performance of the solar power supply 20. The values and statistics may be transmitted to the maintenance manager to determine if the solar power supply 20 is still operating in an expected manner. The maintenance manager may include predetermine values and statistics that identify an acceptable level of performance. The values and statistics received from the system manager are compared with the acceptable values to determine if the solar power supply 20 is operating below an expected level. If the solar power supply 20 is operating below an expected level, a technician may be notified and the status display 410 of the gateway 400 may be updated. The maintenance manager may continue to receive values and statistics from the system manager and establish a performance baseline of the solar power supply 20. As additional values and statistics are received, the maintenance manager determines whether the performance is degrading and may notify a technician.

In some embodiments, the communication module 300 may be integral to the gateway 400. One or more components of the communication module 300 may be omitted and similar components from the gateway 400 may be utilized. The cellular module 340 and GNSS module 350 may be positioned within or on a housing of the gateway 400. The UPS 360 may be one of the batteries 455, 456 of the gateway 400. As discussed above, in some embodiments, the communication module 300 may be an external communication module that connected to the gateway 400 via the antenna communications port 426 and a cable 50. The antenna communications port 426 and cable 50 may be substituted for internal connections in embodiments with an integral communication module 300 as would be appreciated by one of ordinary skill in the art having the benefit of this disclosure. The antenna communications port 426 may be used to connect an additional sensor module 100, 200 and/or may be used to connect an external communication module 300 as a fallback system or when performing local diagnostics.

In some embodiments, the gateway 400 may be used to route data from the sensor modules 100, 200 upon receiving data from the sensor modules 100, 200 rather than pulling data from the sensor modules 100, 200. For example, rather than periodically pulling data from the sensor modules 100, 200, the sensor modules 100, 200 may be configured to periodically push the data to the offsite system 40 (shown in FIG. 1), which may be facilitated by the gateway 400. Data from the sensor modules 100, 200 may be temporarily stored within a buffer in the gateway 400 as the data is transmitted. In addition, the sensor modules 100, 200 may be configured to periodically push data to the gateway 400 for transmission to the offsite system 40. The sensor modules 100, 200 may simultaneously, or close thereto, push data so that the time that the communication module 300 is not in its standby state is limited. The time that the communication module 300 is not in its standby state when transmitting routine transmissions may be less than ten seconds per minute, such as five seconds or less per minute. The gateway 400 may continue to monitor and supply power to the sensor modules 100, 200. Communications and requests from the offsite system 40 are directed to the gateway 400 of the monitoring system 10 via the communication module 300. The communications and requests may be routed to the sensor module 100, 200 for which they are meant, or kept by the gateway 400 if intended for the gateway 400. The sensor modules 100, 200 and/or gateway 400 may process any requests. For example, a request to change sampling rates or send additional data may be implemented by the sensor modules 100, 200. The central processing units 130, 230 of the respective sensor module 100, 200 analyzes and prepares the sensor data to be pushed to the gateway 400 for transmission to the offsite system 40. The sensor data may be stored in flash memory 103, 203 on the sensor modules 100, 200 until the data transmission has been acknowledged. In some embodiments, the data may be stored longer until it is purged by a ring buffer. Raw sensor data and maintenance data that has not been purged may be accessed upon a request that is routed through the gateway 400.

Figure 6:
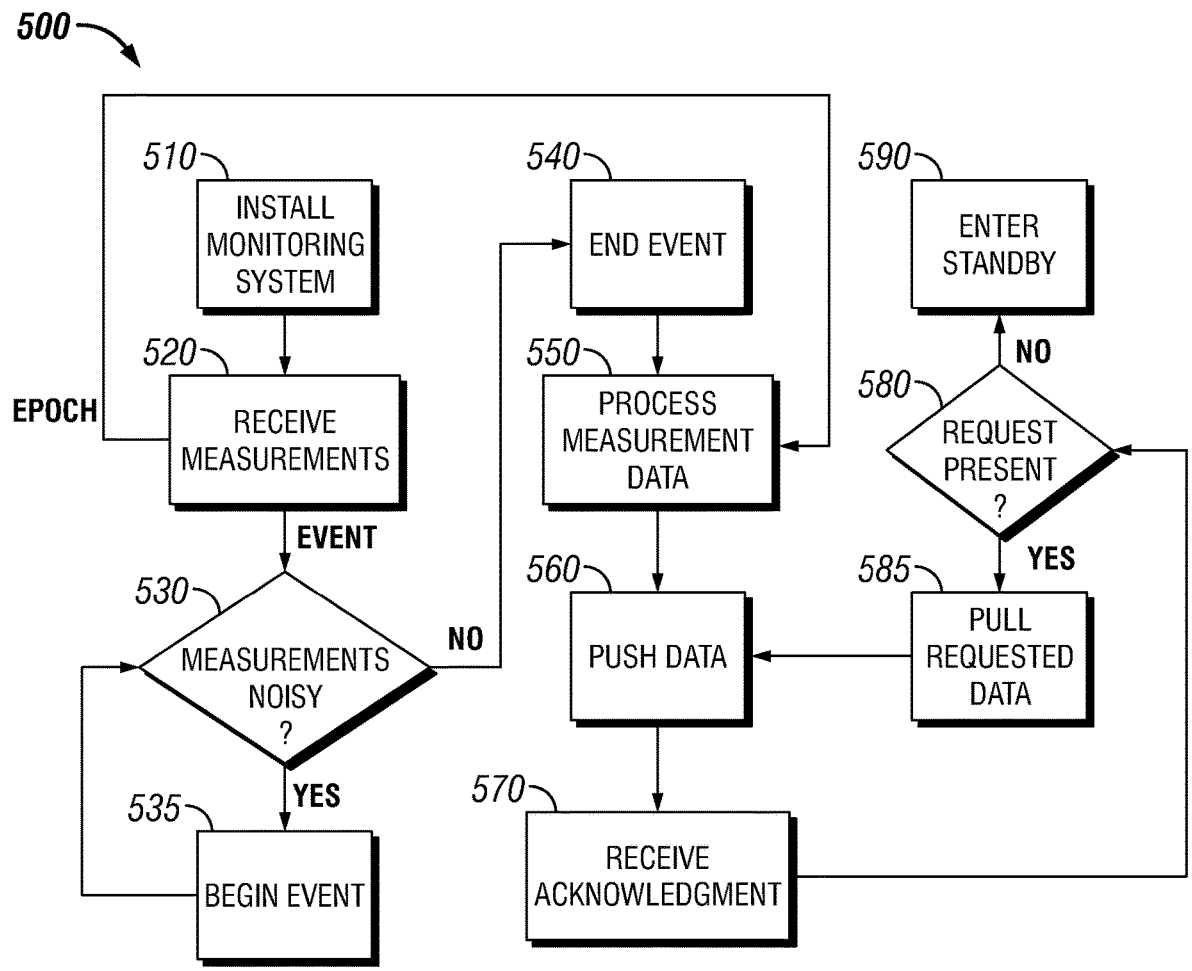
FIG. 6 shows a flow diagram of an embodiment of a method for monitoring a structure.

FIG. 6 shows a flow diagram of an embodiment of a method 500 for monitoring a structure. Initially, a monitoring system may be installed upon a structure desired to be monitored in Action 510. By way of example, the structure may be a bridge, building, utility infrastructure, tower, offshore rig, or other structure. The monitoring system may be used to monitor and report settlement, subsidence, scour, vibration, seismic activity, collisions, deformation, alignment shifts, and/or other conditions. The monitoring system includes a gateway, a plurality of sensor modules, and a communication module. The monitoring system may include an integrated power generation system, such as a solar power supply. The monitoring system is attached to the structure in preparation for monitoring. The monitoring system may include six or fewer sensor modules connected directly to the gateway. Additional monitoring systems may be installed in various locations on the structure. A gateway 400 and a solar power supply 20 may be preinstalled upon a beam or other member that can be attached to the structure to further reduce installation time.

The method 500 includes Action 520 of receiving measurements by the sensor modules. The sensor modules may determine whether the measurements are noisy in Decision 530. If the measurements are noisy then the beginning of an event may be marked in Action 535. The event continues until the measurements are no longer noisy and the end of an event is marked in Action 540. Alternatively, or in addition, the measurements may be part of an epoch data stream, in which Decision 530, Action 535, and Action 540 may be omitted. The measurement data may then be processed in Action 550. If the measurements are not noisy then minimal processing may be conducted. For example, the sensor module may prepare a packet summarizing the minimal data in Action 550.

The processing of data may include statistical analysis, time referencing of data, and/or forming a data stream. The data streams may include an epoch data stream, a raw data stream, a PPV data stream, an event data stream, or combinations thereof. The beginning of the event and the end of an event may be used to denote an event data stream. Raw data corresponding to the event data stream may be stored locally for future access if desired. The processed data may be formed into a packet for transmission. In some embodiments, multiple data streams may be used and overlap. For example, an epoch data stream may be processed for one minute intervals and an event data stream may span multiple epoch data streams. The event data stream may be transmitted with the most recent epoch data stream. In some embodiments, the event data stream may be transmitted upon the end of an event.

The sensor module periodically provides packets to the gateway to be transmitted to an offsite system. Depending on the configuration of the gateway, the gateway may periodically pull packets from the sensor module or the sensor module may periodically push packs to the gateway. In Action 560, the communication module exits a standby state and the data packets are pushed to an offsite system. The communication module may periodically exit its standby state to push data packets. For example, the communication module may exit its standby state for five seconds or less each minute to determine whether a previous data packet successfully transmitted, transmit a new data packet, and/or receive any requests from the offsite system. Depending on the configuration of the gateway, data packet(s) from the sensor modules may be temporarily stored and transmitted once the communication module exits its standby state. In some embodiments, the communication module exits its standby state whenever a packet is received from a sensor module. Packets from multiple sensor modules may be time grouped to limit the period in which the communication module is not in its standby state, in order to conserve power. It may be advantageous for the communication module to exit its standby state whenever a packet is received so as to more quickly transmit data that may correspond to a significant event. The data packets may also include maintenance data. If a communications link with the offsite system is unavailable, the data packets may be temporarily stored.

Once the data packet has been received by the offsite system, an acknowledgement may be received in Action 570. The acknowledgement may be verified by the communication module and provided to the gateway and/or sensor modules. In Decision 580, the gateway may determine whether any data received by the communication module includes a request. Depending on the configuration of the gateway, information directed to one or more of the sensor modules may be routed to the sensor module(s) and the sensor module may determine whether a request is present. The request may indicate that the raw data corresponding to the event or another event is needed. The request may be automatically determined based upon the statistical values of the event. The request may indicate that sampling rates of the monitoring system should be increased for a period after the event, which may be implemented by the gateway and/or the sensor modules. If a request for raw data is present, the gateway pulls the requested data from the sensor modules in Action 585, or the sensor modules push the requested data to the gateway. The raw data is routed to the offsite system for further analysis. If no request is present, or no further requests are present after transmitting the raw data, the communication module re-enters its standby state in Action 590 until the communication module again exits its standby state to push new data.

Figure 7:
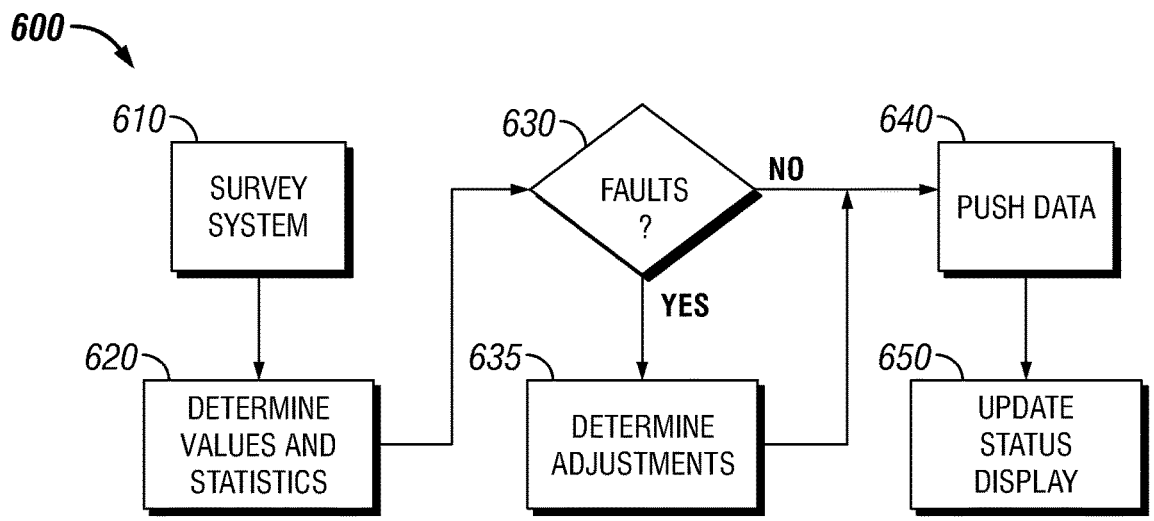
FIG. 7 shows a flow diagram of an embodiment of method for monitoring faults in a monitoring system.

FIG. 7 shows a flow diagram of an embodiment of method 600 for monitoring faults in a monitoring system. The method includes Action 610 of surveying the monitoring system. The survey may be conducted by a system manager. The system manager may be implemented by a central processing unit. The system manager may access and include the collected maintenance data for the sensor modules, communication module, and gateway. Additional maintenance data may include a performance trend, signal strength, a lightning strike counter, and/or humidity level and pressure level inside a housing of the gateway or sensor modules. The system manager may assess previously collected maintenance data. In Action 620, the system manager calculates values and/or statistics relating to the current power demands of the monitoring system, the operating conditions of the monitoring system, and/or the connections between components of the monitoring system. Examples of additional diagnostics may include one or more of: determining a trending value over a period of time, determining inconsistencies between the power consumption of a sensor module and historic power consumption of the sensor module and/or current power consumption of other sensor modules, determining inconsistencies between the power consumption of a gateway and historic power consumption of the gateway, monitoring solar input to determine load-shedding, and monitoring internal conditions of a sensor module or gateway to detect for leaks or effects of solar radiation. For instance, changes in temperature, humidity, and/or pressure measurements inside a sealed housing may indicator that a seal is leaking or that environmental conditions have changed.

In Decision 630, the system manager determines whether any faults exist. If no faults exist, then a monitoring packet indicating no faults may be pushed to a maintenance manager in Action 640. The maintenance manager may be an offsite maintenance manager accessible through or located at the offsite system 40. If a fault exists, the system manager may determine whether adjustments may be made to fix or temporarily alleviate the fault in Action 635. For example, if the available power drops below a predetermined level, the system manager may begin disabling sensor modules in order to prolong operation of the remaining portion of the system. If the fault may be fixed, a monitoring packet indicating the adjustment may be pushed to a maintenance manager in Action 640. If the fault could not be resolved, then a monitoring packet indicating the continuing fault condition may be pushed to a maintenance manager in Action 640. The offsite manager may determine whether additional actions may be taken by the system manager to resolve the fault or if a technician should be notified. In Action 650, a status display on the gateway is updated with the current state of the monitoring system.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A system for monitoring integrity of a structure, the system comprising:
    at least one sensor module positioned to monitor the integrity of a structure;
    a gateway in communication with the at least one sensor module, the gateway being configured to periodically receive data packets from the at least one sensor module and push the data packets to an offsite system, the gateway configured to push the data packets to the offsite system without first receiving a request from the offsite system to send the data packets, the data packets including a plurality of measurements of a response of the structure to an external load acting upon the structure;
    a solar power supply including batteries, the solar power supply being connected to the gateway, the gateway being configured to supply power to the at least one sensor module; and
    a direct power supply connected to the gateway, the gateway including an input selector configured to select between the solar power supply and the direct power supply, the gateway configured to change from the direct power supply to the solar power supply when direct power becomes unavailable.

2. The system of claim 1, further comprising a communication module configured to transmit the data packets over a communications link to the offsite system.

3. The system of claim 2, wherein the communication module includes a cell module having a dynamic IP address, the communications module configured to connect to a virtual private network.

4. The system of claim 2, wherein the communication module includes a standby state, the communication module being configured to remain in the standby state until information is received from the gateway.

5. The system of claim 1, wherein the at least one sensor module is a plurality of sensor modules, each of the plurality of sensor modules being connected directly to the gateway via a respective cable.

6. The system of claim 5, further comprising a Global Navigation Satellite System (GNSS) Module configured to obtain GNSS time data, the gateway being configured to relay the GNSS time data to the plurality of sensor modules, the plurality of measurements being time-referenced with the GNSS time data.

7. The system of claim 5, wherein the plurality of sensor modules include a sensor module having an image sensor and an illumination module, the illumination module being configured to pulse at a frame rate of the image sensor.

8. The system of claim 1, wherein the at least one sensor module includes a sensor module having an inclinometer and an accelerometer, an axis of measurement being common between the inclinometer and the accelerometer.

9. The system of claim 1, wherein the structure is a bridge.

10. The system of claim 9, wherein the at least one sensor module is positioned to monitor for at least one of settlement, subsidence, scour, vibration, deformation, or a shift of the structure.

11. The system of claim 1, wherein the input selector is configured to prioritize direct power over solar power when direct power is available.

12. The system of claim 5, further comprising a power monitor configured to disable or prioritize power to one of the plurality of sensor modules when an available amount of power drops below a predetermined level.

13. A method for monitoring integrity of a structure, the method comprising:
collecting data from a plurality of sensor modules, the plurality of sensor modules positioned to monitor the integrity of a structure, the data including measurements of a response of the structure to an external load acting upon the structure;
time synchronizing at least a portion of the data from the plurality of sensor modules, the portion of the data including a first plurality of measurements and a second plurality of measurements;
periodically routing the portion of the data from the plurality of sensor modules to a gateway, the gateway being configured for bi-directional communication with the plurality of sensor modules;
powering the plurality of sensor modules and the gateway via a solar power supply, the gateway managing and supplying power from the solar power supply to the plurality of sensor modules;
receiving the first plurality of measurements to a communication module from the gateway;
the communication module exiting a standby state and transmitting the first plurality of measurements to an offsite system without receiving a request from the offsite system to transmit the first plurality of measurements, wherein the communication module transmits the first plurality of measurements via a cell module having a dynamic IP address, the first plurality of measurements includes maintenance data for the plurality of sensor modules, the communication module, or the gateway, wherein the maintenance data includes at least one of i) values and/or statistics relating to a power demand of the gateway and the plurality of sensor modules; ii) values and/or statistics relating to performance of the solar power supply; iii) values and/or statistics relating to connections between the gateway and the plurality of sensor modules; or iv) a humidity level or a pressure level inside a housing of one of the plurality of sensor modules;
receiving the second plurality of measurements to the communication module from the gateway;
after transmitting the first plurality of measurements, the communication module reentering the standby state until receiving the second plurality of measurements; and
the communication module exiting the standby state and transmitting the second plurality of measurements without receiving a request from the offsite system to transmit the second plurality of measurements.

14. The method of claim 13, further comprising determining a power failure and pushing a data packet to the offsite system indicating the power failure utilizing an uninterruptible power source.

15. The method of claim 13, further comprising installing the gateway and the plurality of sensor modules at a location without a grid-power supply.

16. The method of claim 13, wherein when the communication module exits the standby state and transmits the second plurality of measurements, the communication module receives data from the offsite system.

17. The method of claim 16, wherein the data received from the offsite system indicates at least one of a successfulness of the transmission of the first plurality of measurements, a set of updated operating conditions, or a request to send additional measurements.

18. The method of claim 17, wherein the data received from the offsite system indicates the request to send additional measurements and the additional measurements are raw data corresponding to an event in the first plurality of measurements.

19. The method of claim 13, wherein the maintenance data includes values and/or statistics relating to a power demand of the gateway and the plurality of sensor modules.

20. The method of claim 13, wherein the maintenance data includes values and/or statistics relating to performance of the solar power supply.

21. The method of claim 13, wherein the structure is a bridge.

22. The method of claim 13, wherein time synchronizing at least a portion of the data from the plurality of sensor modules comprises time referencing the data with Global Navigation Satellite System (GNSS) time data.

23. A method for monitoring integrity of a structure, the method comprising:
collecting data from a plurality of sensor modules, the plurality of sensor modules positioned to monitor the integrity of a structure, the data including measurements of a response of the structure to an external load acting upon the structure;
time synchronizing at least a portion of the data from the plurality of sensor modules, the portion of the data including a first plurality of measurements and a second plurality of measurements;
periodically routing the portion of the data from the plurality of sensor modules to a gateway, the gateway being configured for bi-directional communication with the plurality of sensor modules;
receiving the first plurality of measurements to a communication module from the gateway;
the communication module exiting a standby state and transmitting the first plurality of measurements to an offsite system without receiving a request from the offsite system to transmit the first plurality of measurements, the first plurality of measurements includes maintenance data for the plurality of sensor modules, the communication module, or the gateway, wherein the maintenance data includes values and/or statistics relating to connections between the gateway and the plurality of sensor modules;

receiving the second plurality of measurements to the communication module from the gateway;

after transmitting the first plurality of measurements, the communication module reentering the standby state until receiving the second plurality of measurements; and the communication module exiting the standby state and transmitting the second plurality of measurements without receiving a request from the offsite system to transmit the second plurality of measurements.

24. A method for monitoring integrity of a structure, the method comprising:

collecting data from a plurality of sensor modules, the plurality of sensor modules positioned to monitor the integrity of a structure, the data including measurements of a response of the structure to an external load acting upon the structure;

time synchronizing at least a portion of the data from the plurality of sensor modules, the portion of the data including a first plurality of measurements and a second plurality of measurements;

periodically routing the portion of the data from the plurality of sensor modules to a gateway, the gateway being configured for bi-directional communication with the plurality of sensor modules;

receiving the first plurality of measurements to a communication module from the gateway;

the communication module exiting a standby state and transmitting the first plurality of measurements to an offsite system without receiving a request from the offsite system to transmit the first plurality of measurements, the first plurality of measurements includes maintenance data for the plurality of sensor modules, the communication module, or the gateway, wherein the maintenance data includes a humidity level or a pressure level inside a housing of one of the plurality of sensor modules;

receiving the second plurality of measurements to the communication module from the gateway;

after transmitting the first plurality of measurements, the communication module reentering the standby state until receiving the second plurality of measurements; and the communication module exiting the standby state and transmitting the second plurality of measurements without receiving a request from the offsite system to transmit the second plurality of measurements.

* * * * *